United States Patent [19]
Ammons

[11] Patent Number: 5,174,724
[45] Date of Patent: Dec. 29, 1992

[54] WIND-ELECTRIC WATER PUMPING SYSTEM

[76] Inventor: Joe L. Ammons, 1617 Lawson Ln., Amarillo, Tex. 79106

[21] Appl. No.: 761,641

[22] Filed: Sep. 18, 1991

[51] Int. Cl.⁵ .............................................. F03D 9/00
[52] U.S. Cl. .................................... 417/35; 417/374; 417/334; 417/539; 296/44; 296/55; 416/112; 416/132 B
[58] Field of Search ............... 417/374, 334, 335, 336, 417/35, 539; 416/132 B, 112, 113; 290/55, 44

[56] References Cited

U.S. PATENT DOCUMENTS

| | | | |
|---|---|---|---|
| 247 | 4/1799 | Dearborn | 290/55 |
| 544,922 | 8/1895 | Lundqvist | 416/132 B |
| 1,047,274 | 12/1912 | Murdock | 416/112 A |
| 3,957,397 | 12/1974 | Wendler | 417/35 |
| 4,186,313 | 1/1980 | Wurtz | 290/55 |
| 4,545,729 | 10/1985 | Storm | 416/132 B |
| 4,792,700 | 12/1988 | Ammons | 290/55 |
| 5,122,031 | 6/1992 | Westwood | 417/334 |

Primary Examiner—Richard A. Bertsch
Assistant Examiner—Peter Korytnyk
Attorney, Agent, or Firm—Richard C. Litman

[57] ABSTRACT

Disclosed is a two cylinder water well pumping system which uses the wind as a primary driving force with an alternate electric motor drive for use when the wind force is not adequate. The wind drives a square wheel turbine which in turn drives a swash plate which provides a cam surface which then drives a semaphore assembly directly or indirectly connected to sucker cables in turn connected to two pistons carried, respectively, in two cylinder sleeves. The inclined angle of the swash plate alternately drives the pistons to pump water from a well into a storage tank also serving as a mainmast supporting said turbine. In an alterenative embodiment, an electric motor is connected to drive an osillatable bar on a mechancial relay. The oscillatable bar is connected by cables to the semaphore assembly, and may be disconnected from the semaphore assembly by a solenoid. In this embodiment, the sucker cables are connected to the rockable bar in the mechanical relay rather than to the semaphore assembly.

14 Claims, 11 Drawing Sheets

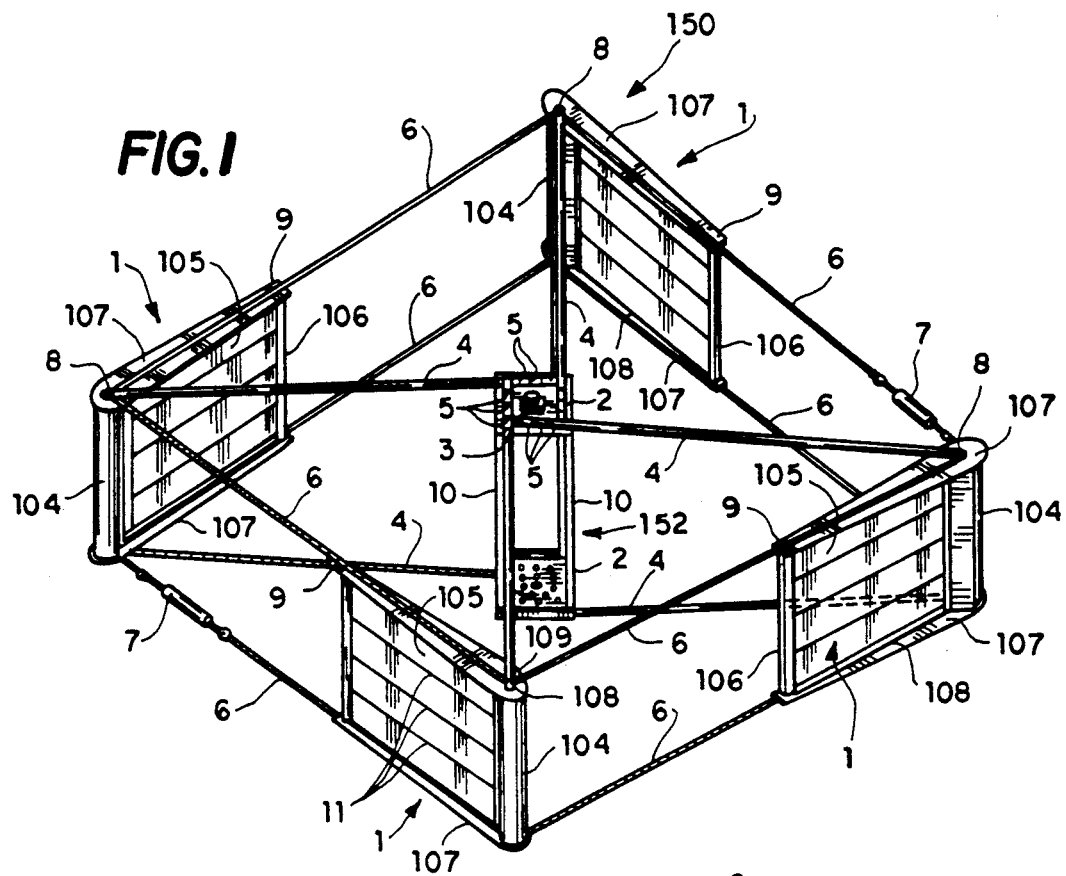
FIG. 1
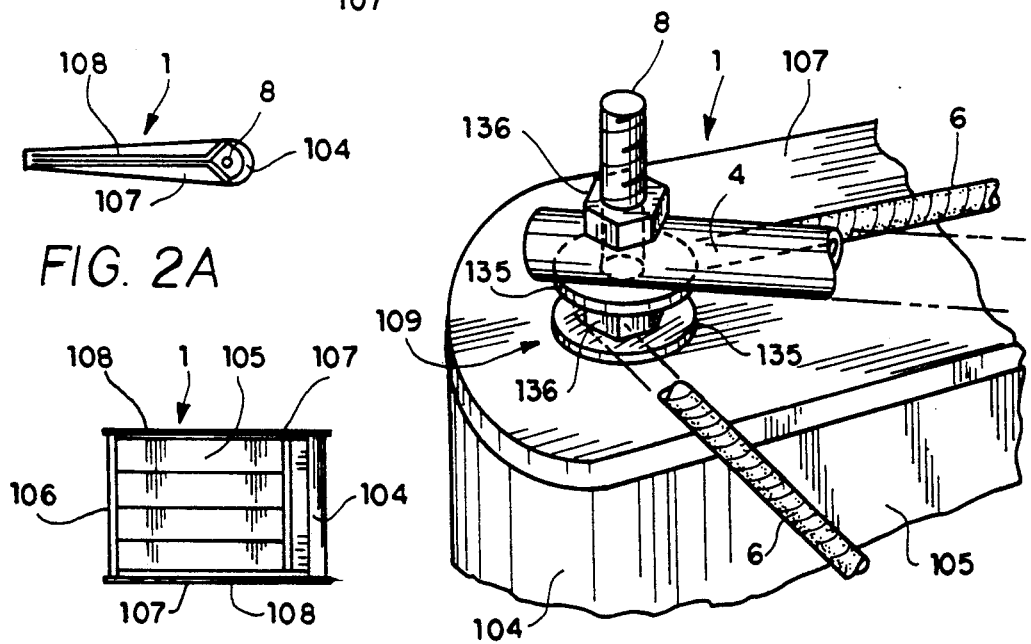
FIG. 2A
FIG. 2B
FIG. 26

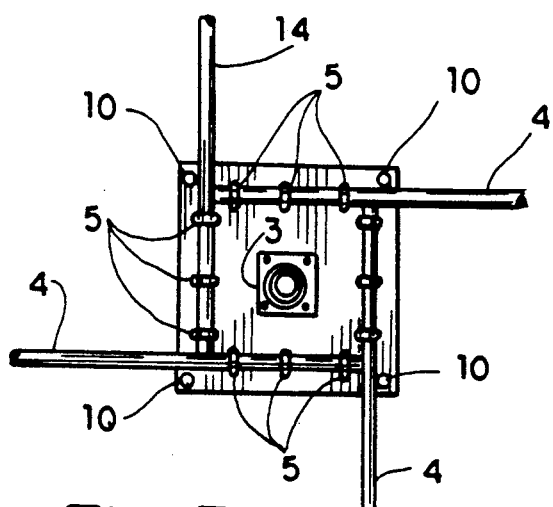
FIG. 3
FIG. 4
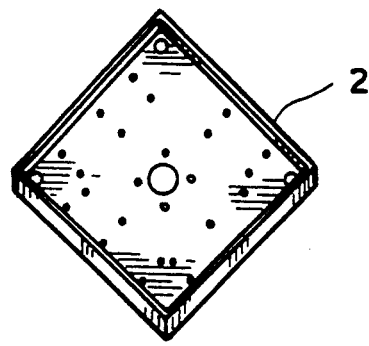
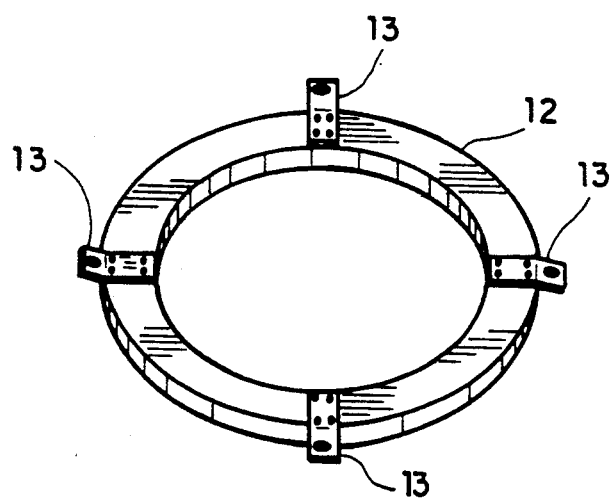
FIG. 5
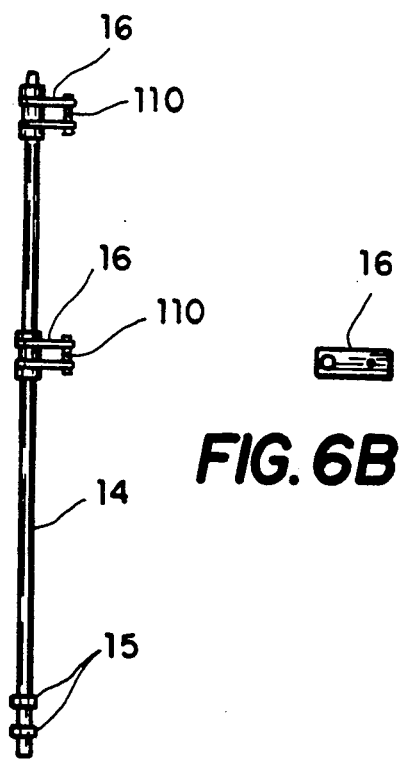
FIG. 6B
FIG. 6A FIG. 14
FIG. 15
FIG. 23
FIG. 17
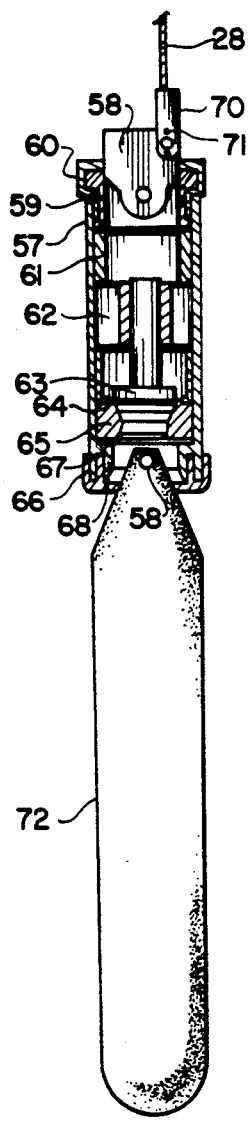
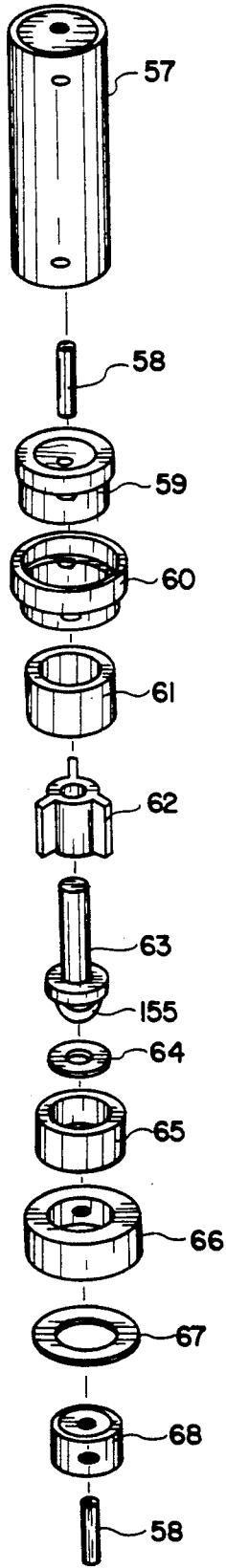
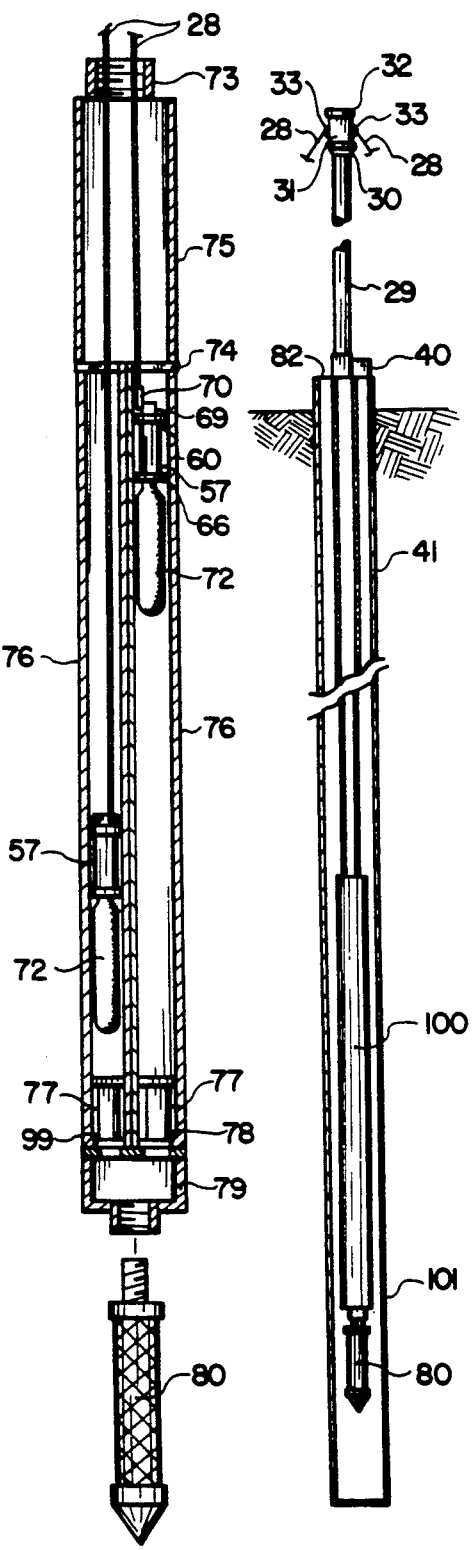

WIND-ELECTRIC WATER PUMPING SYSTEM

BACKGROUND OF THE INVENTION

1. Field of The Invention

This invention relates to an improved two cylinder water well pumping system which uses the wind driving a unique windmill as the primary driving force, with an alternate electric motor drive for use when the wind force is not adequate.

It is common practice in drilling windmill wells to drill down to and through the water bearing sands and then to extend the well on down a short distance into the clay or shale below the water. A well casing pipe is lowered into this hole until it rests on the firm bottom of the well. At a specified distance from the bottom of the well, perforations are made in the well casing pipe to allow water to flow into the casing pipe. The water can then flow through a sand filter and then into a pump. In the past, water flowed into a one cylinder pump where it passed through a foot check valve, then a piston check valve and was then pushed up through a sucker pipe by the up and down action of the piston, the foot check valve closing and the piston check valve opening on the down-stroke, the foot check valve opening and the piston check valve closing on the up-stroke. This technology may be 4,000 years old. This single piston was pushed and pulled by sucker rods made of metal, wood or plastic which were screwed together to form a continuous rod up to the pumping mechanism of the windmill. The piston in those systems had to lift against the entire weight and pressure of the water at the bottom of the sucker pipe which, by way of example, with a 2 inch sucker pipe, in a 500 foot deep well, would have a pressure of 216 psig or an approximate total weight of about 677 pounds. This is a heavy load for a standard windmill to carry and has resulted in a slow demise of the American windmill as a means of pumping well water. The windmill has been replaced, in many cases, by a submersible electric pump.

2. Description Of Related Prior Art

U.S. Pat. No. 4,792,700, issued Dec. 28, 1988 to me, discloses a windmill similar to that used in the current invention and accordingly is incorporated herein by reference.

SUMMARY AND OBJECTS OF THE INVENTION

It is an object of this invention to provide an improved water pumping system which is alternatively driven by means of a windmill or an electric motor.

It is another object of this invention to provide an improved water well pumping system which uses two pump cylinders and two pump pistons to lift the water more efficiently.

It is a still further object of this invention to provide a two cylinder pump arrangement as a brake to slow the windmill down in high winds, whereby the windmill is caused to work at an almost constant rate of speed regardless of the force of the wind.

It is an additional object of the invention to provide an electric motor to drive the two cylinder pump arrangement in the absence of any wind to drive the windmill.

The wind-electric water pumping system of the present invention uses the same well sucker pipe and sand filter as in the past, but the well sucker pipe is divided into two pipe cylinders each with its own foot valve and piston, and instead of using a single sucker rod, the system uses two sucker cables which are pulled up through a single sucker pipe and which are tied to the semaphore or relay arms of the windmill. First one cable and then the other is pulled the full length of its stroke. The pressure of the water can be used to push the piston back down. The casing pipe is usually packed all the way down with gravel so that the water entering the pump cylinder is approximately at one atmosphere pressure while the pressure of the water above the piston is depth pressure, or with 500 feet, about 15 atmospheres. Accordingly, the pressure in the well does the work of pushing the piston down and also helps pull the other piston up since both pistons are tied together through the cables and pumping arms at the surface. Since both pistons are working against an almost identical load, the pressures and weights tend to cancel each other out and the windmill only has to overcome the effects of friction and inertia. The load is practically in balance.

Not only does this two cylinder arrangement decrease the amount of energy required to operate the pump, it also acts as a brake to slow the windmill down in high winds. The piston is designed to slightly restrict the flow of water through the piston as the piston descends. Accordingly, a finite time is required for the piston to drop through its down stroke. If the windmill tries to turn faster than the rate of piston descent, the cable on the descending side will buckle and throw the system out of balance. Without the help of the descending piston, the windmill must lift the entire load on the other piston by itself and there is a dramatic slow down and readjustment of speed.

Other objects, features and advantages of this invention will become apparent from the following detailed description and the amended claims, reference being made to the accompanying drawings forming a part of the specification, wherein like reference numerals designate corresponding parts of the several views.

BRIEF DESCRIPTION OF THE DRAWINGS

FIG. 1 is a perspective view of the square wheel turbine or windmill.

FIG. 2A is a top view of a sail of the square wheel turbine or windmill.

FIG. 2B is a side view of the sail of FIG. 2A.

FIG. 3 is a top view of the hub of the square wheel turbine or windmill.

FIG. 4 is a perspective view of the inside of a square hub pan forming a portion of the hub of FIG. 3.

FIG. 5 is a perspective view of the swash plate.

FIG. 6A is a side view of a swash plate hanger rod.

FIG. 6B is a top view of an attachment clamp designed to be mounted on the swash plate hanger rods of FIG. 6A.

FIG. 13 is a perspective view of the square wheel turbine or windmill together with an insulated mainmast and sucker pipe.

FIG. 14 is a cross-sectional side view of the assembled piston.

FIG. 15 is an exploded perspective view of the piston, showing its component parts.

FIG. 16A is a cross-sectional view of the cylinder to sucker pipe fitting adapter.

FIG. 16B is a cross-sectional view of the dual pump cylinders.

FIG. 17 is a cross-sectional view of the well showing the well casing pipe and the main pump assembly.

FIG. 23 is a side cross-sectional view showing the dual cylinders and the water inlet filter.

FIG. 26 is a perspective view showing a cable spool arrangement for the sail drawcable.

DETAILED DESCRIPTION OF THE PREFERRED EMBODIMENT

Figure 7:
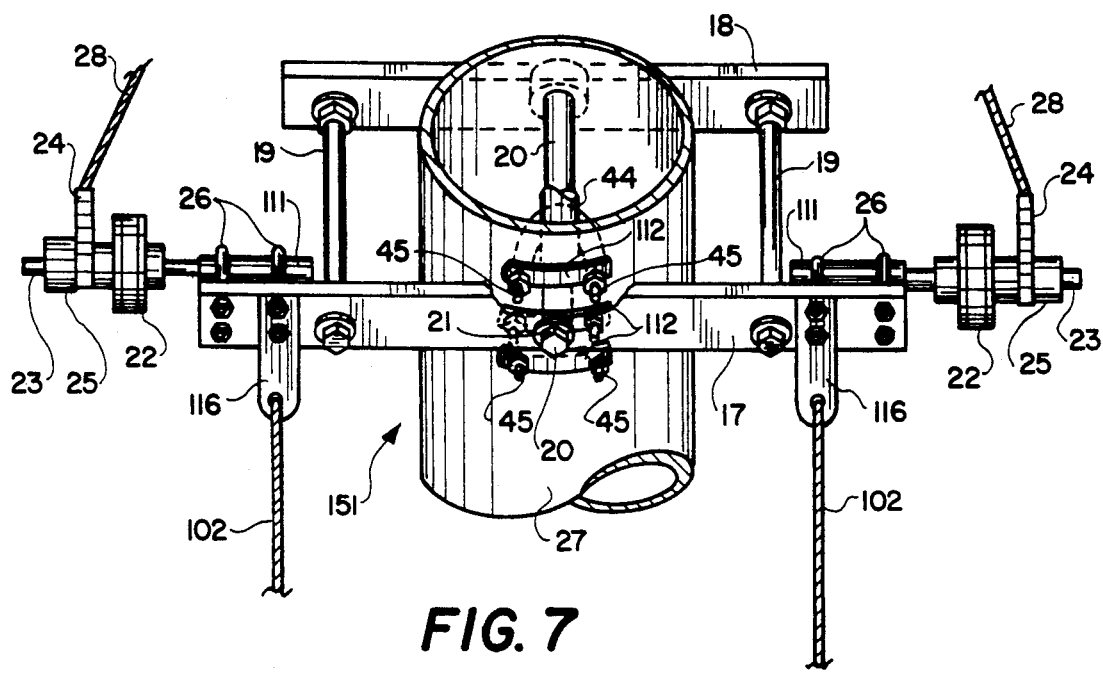
FIG. 7 is a perspective view of the semaphore assembly.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also, it is to be understood that the phraseology and terminology employed herein is for the purpose of description and not limitation.

Turning now to the drawings, this invention comprises a square wheel turbine or windmill 150 with specially constructed sails 1 at each corner, which rotates in the wind on bearings 3 located on the main shaft 44. This shaft 44 is bolted to a tall length of enclosed piping which acts as both a water storage tank and a mainmast or post 27 of the windmill 150. This mainmast 27 sits on a pivot bearing or cradle 38 attached to an angle-iron base 49. Mainmast 27 is held firmly by guy lines 53 on either side and a rigid stiff leg or strut 48 at the rear. These guy lines 53, strut 48 and base 49 are attached to concrete anchor blocks 55 or buried foundation blocks 51 at the ground level. A swash plate 12 is suspended beneath the square wheel turbine 150 using rods 14 and clamps 16 which hold the swash plate 12 in a selected degree of incline. A semaphore assembly 151 is pivoted on bearings 21 located on a shaft 20 which passes through the mainmast 27. Wheels 22 mounted on both ends of the semaphore bar 17 ride on top of the inclined swash plate 12. As it rotates, the swash plate 12 imparts a reciprocating movement to the semaphore assembly 151. Semaphore assembly 151 has tabs or attachment fittings 24 which can either be attached directly to sucker cables 28 or, alternatively, attached by cables 102 to the pumping relay 117. Pumping relay 117, in turn, is attached to the sucker cables 28. Sucker cables 28 pass over rollers 33 into the windmill sucker pipe 29, where they drop down and are attached to two separate pistons 57 in two pump cylinders 76, respectively, near the bottom of a water well pipe casing 41. These pistons 57 are moved up and down in response to the semaphore action. Attachment fitting set collar 25 is a standard shaft set collar sized to fit over the semaphore wheel shaft 23 and is attached to shaft 23 with set screws. Collar 25 is used to retain the semaphore cable attachment fitting 24 in place, allowing fittings 24 to be so positioned as to align them with windmill sucker cables 28.

Water passes into the well casing 41 through perforations 101, passes through a sand filter 80 and is drawn into the respective pump cylinder 76 where it is pumped to the surface by action of the pistons 57. It is stored in the tank of mainmast 27. This system uses the pressure of the water above the pump cylinders 76 to help windmill 150 pump water to the surface. It also provides an inherent means of automatically braking and slowing the entire system if it tries to run too fast in high winds. Element 82 is a metal or plastic cap or covering fitted over casing pipe 41 with an opening which fits snugly around sucker pipe 29. Its purpose is to prevent foreign objects and debris from falling into the well.

Figure 19:
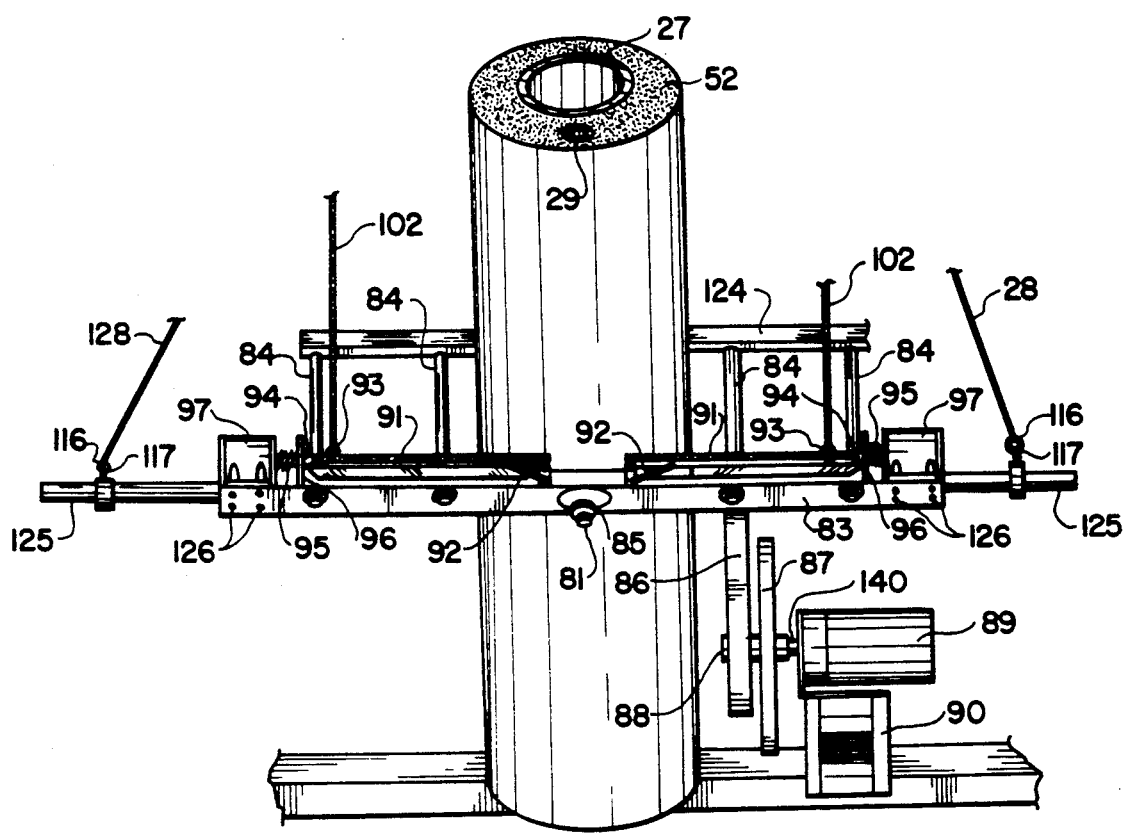
FIG. 19 is a perspective side view of the pump relay with gear motor.
Figure 20:
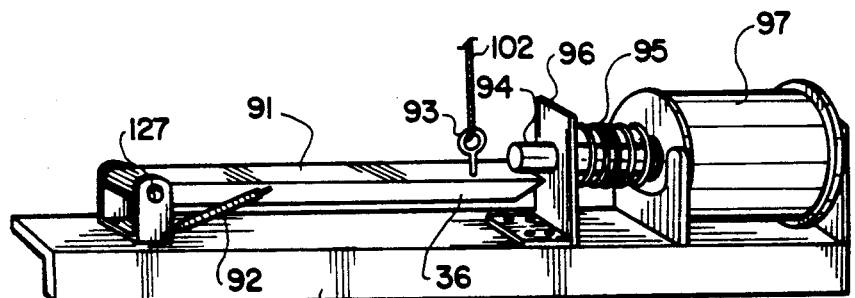
FIG. 20 is a detail of the gear motor flywheel and rocker beam cranks.
Figure 22:
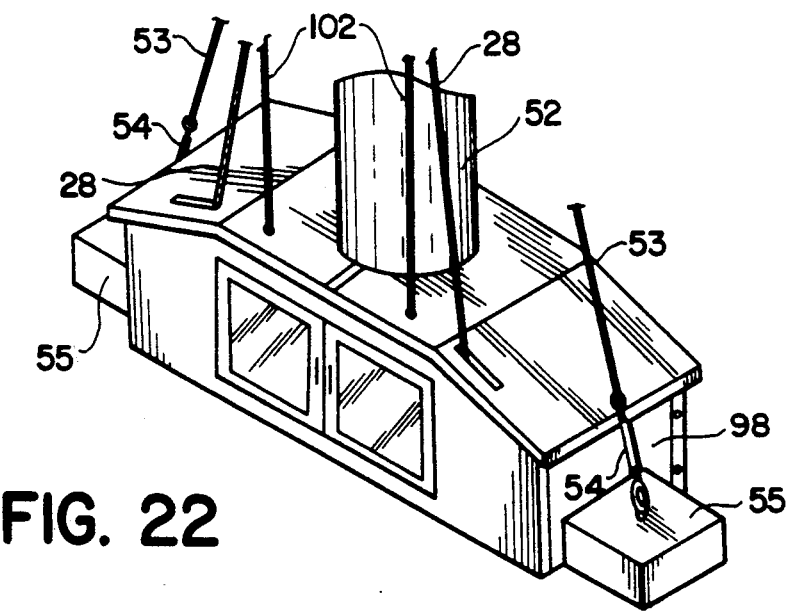
FIG. 22 is a perspective view of housing for the rocker beam.

In cold climates, the entire water system above ground may be readily insulated to prevent freezing as shown by preformed insulation cover 52 in FIGS. 13, 19 and 22, comprising sections of molded polyurethane or the like.

When electricity is available an optional electric motor drive may be installed for use when the wind is not adequate. A pressure control switch 103 senses the pressure of the column of water stored in the tank within the mainmast 27. When the water pressure falls to a predetermined point, it closes the pressure control switch 103 and starts a gear motor 89 which cranks a mechanical relay 59 connected by the sucker cables 28 to the pump pistons 57. At the same time, relay 59 is disconnected from the windmill 150 as long as the gear motor 89 continues to turn. When the water level has risen to a predetermined point, the pressure control switch 103 stops the gear motor 89 and reconnects the windmill 150 to the sucker cables 28 and pump pistons 57.

A prefabricated housing 98 may be used to enclose the gear motor 89 and pump relay assembly 59 to make the system more environmentally pleasing in appearance.

An electric cut-off switch 130 may be installed on the system to stop the system when the tank in mainmast 27 is full or when it is desired to shut down the system manually.

The square wheel turbine 150 used on the Wind-Electric Water Pumping System is quite similar to the one disclosed in my U.S. Pat. No. 4,792,700 issued Dec. 20, 1988. This turbine 150, while not primarily an airfoil, has a high degree of efficiency due to its square structure which positions the sails, parallel to the axis, rather than radial to the axis as is common. This places the sails 1 so that those on the windward side are struck by the wind on the outside surface and due to their particular construction they fill, move and slip the wind, working quite similarly to a sail on a boat. At the same time the sails 1 on the lee side of the turbine 150 also fill, move and slip the wind in the same manner since the inside and outside surfaces of each sail 1 are identical in construction.

Figure 8A:
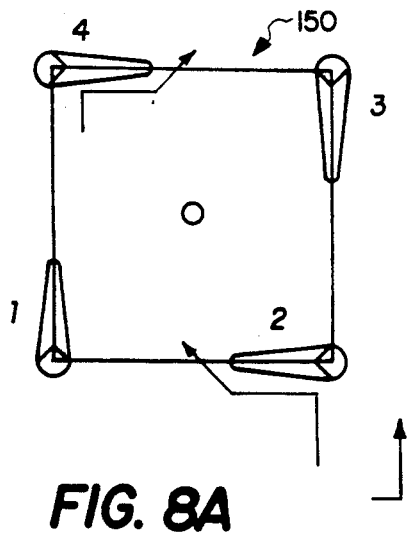
FIGS. 8A-8E, inclusive, demonstrate sequentially how the wind rotates the square wheel turbine or windmill.
Figure 8B:
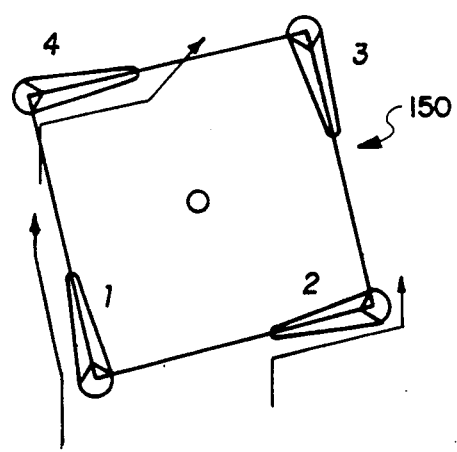
Figure 8C:
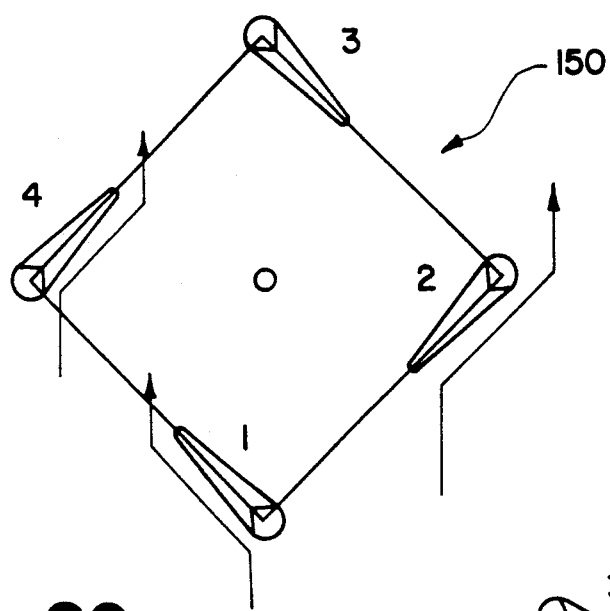
Figure 8D:
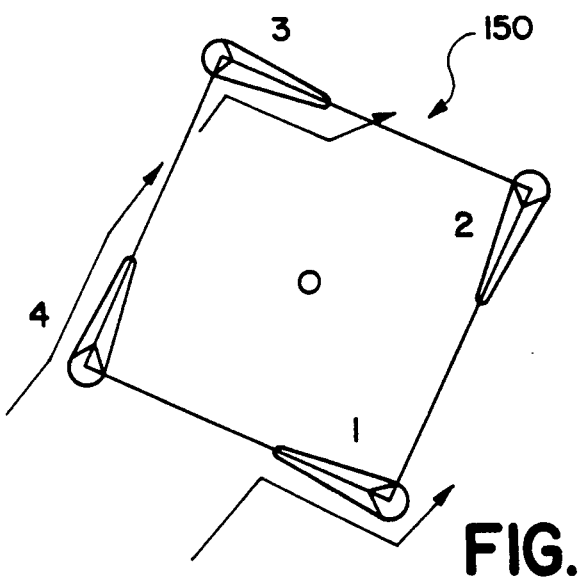
Figure 8E:
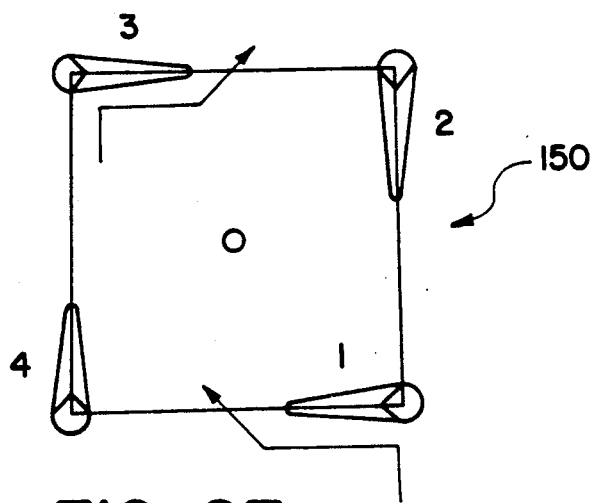
Figure 9A:
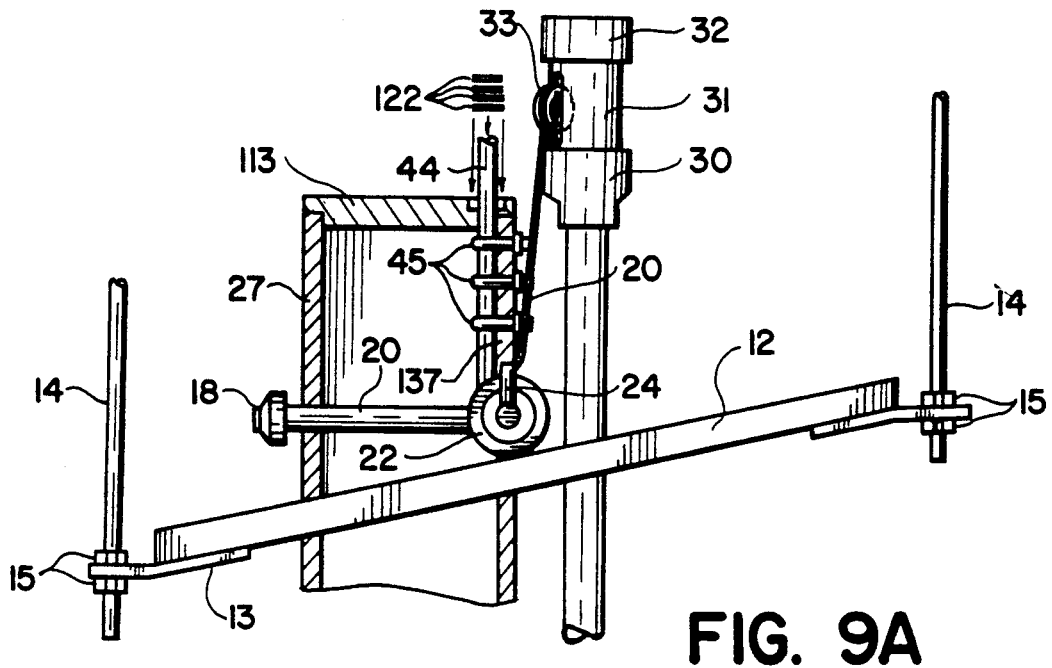
FIG. 9A is a sectional side view of the semaphore mainmast, swash plate and sucker pipe.
Figure 9B:
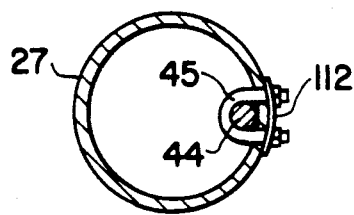
FIG. 9B is a top sectional view of the mainmast together with a reinforcing strap.

FIGS. 8A-8E, inclusive, represent a graphic presentation of the way the wind affects each one of the sails 1 as the turbine 150 turns through one quarter revolution. Note that the positions in FIGS. 8A and 8E are identical except that each sail 1 has moved to the next corner. This cycle is repeated four times for each revolution of the turbine 150.

It was found that the sails in my earlier embodiment had a tendency to hammer and split open, longitudinally, because of the action of the wind popping them in and out as it struck first one side, then the other side of the sail. This problem was solved by bending creases 11 in the flat part of the sails 1 close enough together to rigidify the surface and prevent pulsations. It was also found that putting light sideboards 107 on the top and bottom not only strengthened the sails 1, but also increased their efficiency. It has also been found that this turbine 150 shows a dramatic increase in power up to approximately 30 mph windspeed, see FIG. 25, at which point the power increase flattens somewhat while still rising, and then actually begins to decrease slightly above 70 mph. This makes it possible to leave the turbine 150 running and operating at any wind speed but also makes it imperative to apply a speed brake whenever the wind rises above 25 mph. The turbine 150, itself, will take any wind speed without problem up to tornadic volumes but the pumping apparatus 100 is damaged if it is operated too rapidly. Turbine 150, when properly sized for the load requirements will deliver just as much power as any windfoil or propeller. Turbine 150 is simpler, self starting, needs no trigger work and is omni-directional to the wind. At the same time it will, generally, run slow enough that it does not need to be geared down and will not self destruct in high winds. Also, it is very economical to build and needs little, if any, maintenance of upkeep.

The sails 1 are constructed of light-weight galvanized sheet metal. A semi-cylindrical nose piece 104 with clamping plates is formed as shown in FIGS. 2A and 2B and is clamped and pop riveted to the creased sail flat 105 of each sail 1. A heavier gage sheet metal "U" is riveted across the other end of each sail 1, and forms the tail piece 106. The sideboards 107 are pop riveted to the flat 105 and nose piece 104 through a light sheet metal angle strip 108. A through bolt 8 runs through the nose piece 104 from top to bottom to tie the sails 1 to the wheel spokes 4 through spacer nut 136 and washers 135 which form the cable spool 109. Clamp 9 ties the tail end of the sails 1 to the draw cables 6.

The square wheel turbine hub 152 is constructed by bolting two square hub pans 2 together with corner posts 10. Wheel spokes 4 are made from light galvanized pipe. These spokes 4 are clamped in a pattern shown in FIG. 3 with "U" bolts 5 to hub pans 2. Main turbine bearings 3 are bolted to the top and bottom hub pans 2. The wheel spokes 4 are tied to the sails 1 at each corner by means of through bolts 8. Cables 6 are looped around the entire assembly of turbine 150, riding around the spools 109 and drawn tight with turnbuckles 7. The square wheel turbine hub 152, when assembled, is slightly longer than the sail height. When the cables 6 are drawn up tightly, the spokes 4 are given a slightly convex curvature which, when the swash plate suspension rods 14 are installed, creates a very strong, practically non-collapsible frame work to carry the sails 1. After the square wheel turbine 150 is made tightly rigid, tail clamps 9 are screwed onto draw cables 6.

The clamps 16 or rods 14 are then slipped over the spokes 4 and loosely held with bolts 110. The swash plate 12 is bolted to rods 14 with nuts 15 through fittings 13, and is adjusted to give the proper tilt needed for the required length of piston stroke. The swash plate 12 is then precisely centered to the square wheel turbine 150 and the bolts 110 are tightened to lock the entire assembly together. The swash plate 12, shown on the underside of FIG. 5, is made by laminating several layers of weather impervious fiberboard, or the like, together with exterior glue. Swash attachment fittings 13 are mounted with recessed flat head screws on the top side and locking nuts on the underside.

The tilt of the swash plate 12 is made very shallow in areas where wind speed of only 8 to 12 mph are common. This results in a lower volume of water output per minute but more total running time. A greater tilt is used where higher winds are available and/or greater volume is required.

Figure 28:
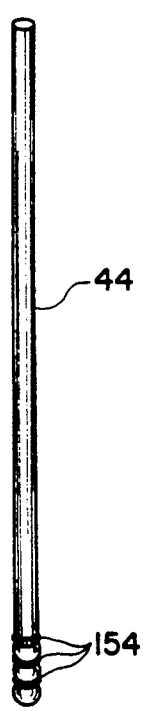
FIG. 28 is a view of the main turbine shaft.
Figure 29:
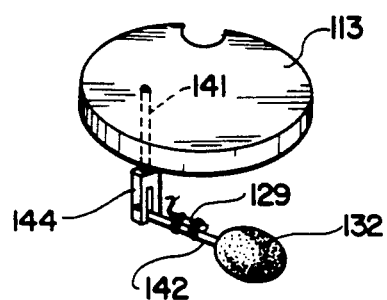
FIG. 29 is a perspective view of a float switch.
Figure 31:
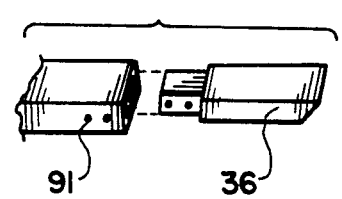
FIG. 31 is a perspective detail of the release arm tongue.
Figure 30:
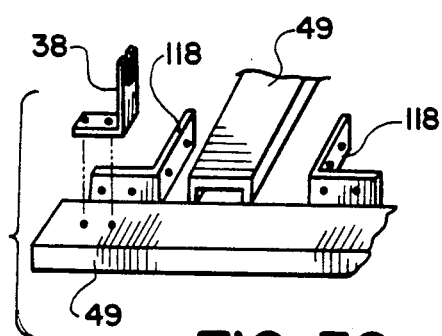
FIG. 30 is a perspective view of the base assembly.

The mainmast 27 is constructed of standard grade, approximately 0.375 inch wall thickness steel pipe. This mainmast or pipe 27 is also used as a storage tank for the well water. As an example, a 12.75 inch outer diameter pipe at the standard 20 foot length would contain about 117 gallons of water when full. Pipe 27 is closed at the bottom with a welded disc 153. Slightly above the bottom of pipe 27, the mainmast pivot shaft 37 passes through the pipe 27 and is welded, water tight. The water outlet fitting 39 is also welded into the pipe 27 near the bottom at the back side of the pipe 27 at 90 degrees from the pivot shaft 37. The water inlet fitting 40 is welded into the front side of pipe 27 high enough to be above the top of well casing pipe 41. The pump relay shaft 81 passes through pipe 27, and is welded, water tight, high enough to clear the gear motor flywheel 87. The semaphore axle 20 is welded through the pipe 27 a short distance from the top. The main turbine shaft 44 rests on shaft 20 inside the pipe 27. It is held in place with "U" bolts 45 which pass through holes 137 drilled in the face of pipe 27 and through gasketed reinforcing straps 112. The "U" bolts 45 are set in shallow grooves 154 (FIG. 28) machined in shaft 44 to prevent the shaft 44 from slipping upward in heavy loads. A removable cap 113 fits over the top of pipe 27 and is held in place with screws (not shown) tapped through pipe 27. An overflow fitting 114 is welded near the top of pipe 27. A pressure control connector fitting 115 is welded near the base.

The semaphore assembly 151 comprises heavy steel bars 17 and 18 in the rear of pipe 27, bored and drilled midway to attach bearings 21 front and rear and are attached with set screws (not shown) on through-shaft 20. Axles 23 are clamped to either end of bar 17 with "U" bolts 26 through offset shim blocks 111 to bring the axles 23 to the centerpoint of swash plate 12. Transmission wheels 22 are mounted on axles 23 with set screws (not shown). They are centered to ride around the top side of swash plate 12 in a rather elliptical trace. The swash plate 12 is wide enough so that the full wheel surface remains on the plate 12 in spite of the elliptical trace even at the full tilt. Bars 17 and 18 are coupled together with semaphore connecting bolts 19. This transmission assembly is rugged enough to handle a water lift load down to 1000 foot depth when used with the dual pump system (or, 450 psig. cylinder pressure) and also to handle braking loads up to 120 mph wind speed. The transmission assembly operates at a one to one transmission ratio or with this dual cylinder system, two piston strokes at each revolution of the turbine 150. Cable connectors are provided at 24 for tying the pump cylinder cables 28 directly to the semaphore assembly 151. Optional cable connectors 116 are provided to connect the semaphore cables 102 to the pump relay rocker beam release arms 91. Transmission wheels 22 are rubber or synthetically tired, roller or ball bearing, industrial, dollie wheels rated at a minimum load tolerance of 500 pounds per wheel.

After the well is drilled and the casing pipe 41 is installed, a sand filter 80 is screwed into the bottom of the pump assembly 100, and this assembly 100 with foot valves 77 in place but without the pistons 57 and cables 28 is screwed onto a length of sucker pipe 29 and then is lowered into the casing pipe 41 one length of sucker pipe 29 at a time until the bottom of casing pipe 41 is reached. Then a cable 28 is tied onto a piston 57 with clevis 70 and cotter pin 71 and is lowered into the sucker pipe 29 until it falls into one of the pump cylinders 76. This piston 57 should then be raised and lowered until water comes up, proving it is pumping properly.

The second piston 57 can then be lowered and with the first piston 57 raised almost to the top of its own cylinder 76; the second piston should be jiggled until it falls into the second cylinder 76. It, too, should be proved by manually pumping it by itself until water flows out. With this arrangement the pistons 57 can be removed, if necessary, for replacement or repair. Foot valves 77 can also be fished out and reinstalled, if necessary, without having to pull the sucker pipe 29. Reference numeral 99 identifies a raised dimple on the inside surface of cylinder sleeve 76. Dimple 99 is formed by striking the outside surface of sleeve 76 with a dimpling punch. Its purpose is to retain foot valve 77 in place in the bottom of sleeve 76. Dimple 99 will allow the leathers of valve 77 to pass over dimple 99 to rest on the bottom of sleeve 76 and to allow foot valve 77 to be lifted past dimple 99 when removing foot valve 77.

Figure 10:
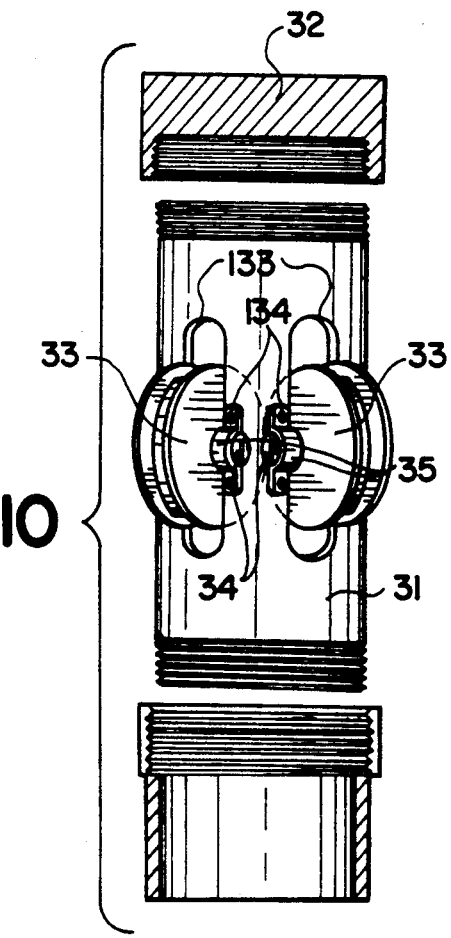
FIG. 10 is a side view of the cap assembly at the top of the sucker pipe.
Figures 11, 12:
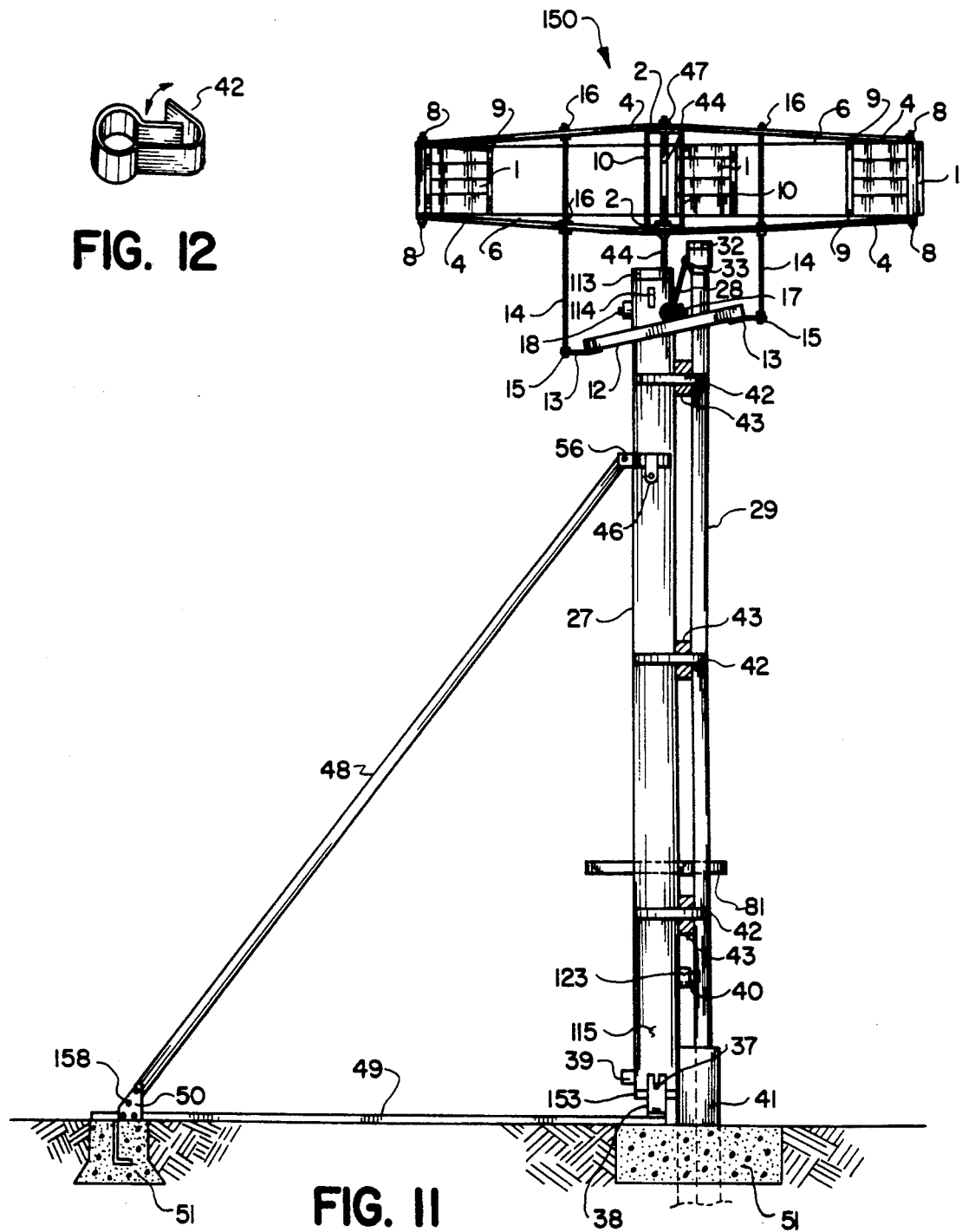
FIG. 11 is a side view of the square wheel turbine or windmill together with supporting structure.
FIG. 12 is a perspective view of a clamp or strapping for connecting the mainmast with the sucker pipe.
Figure 18:
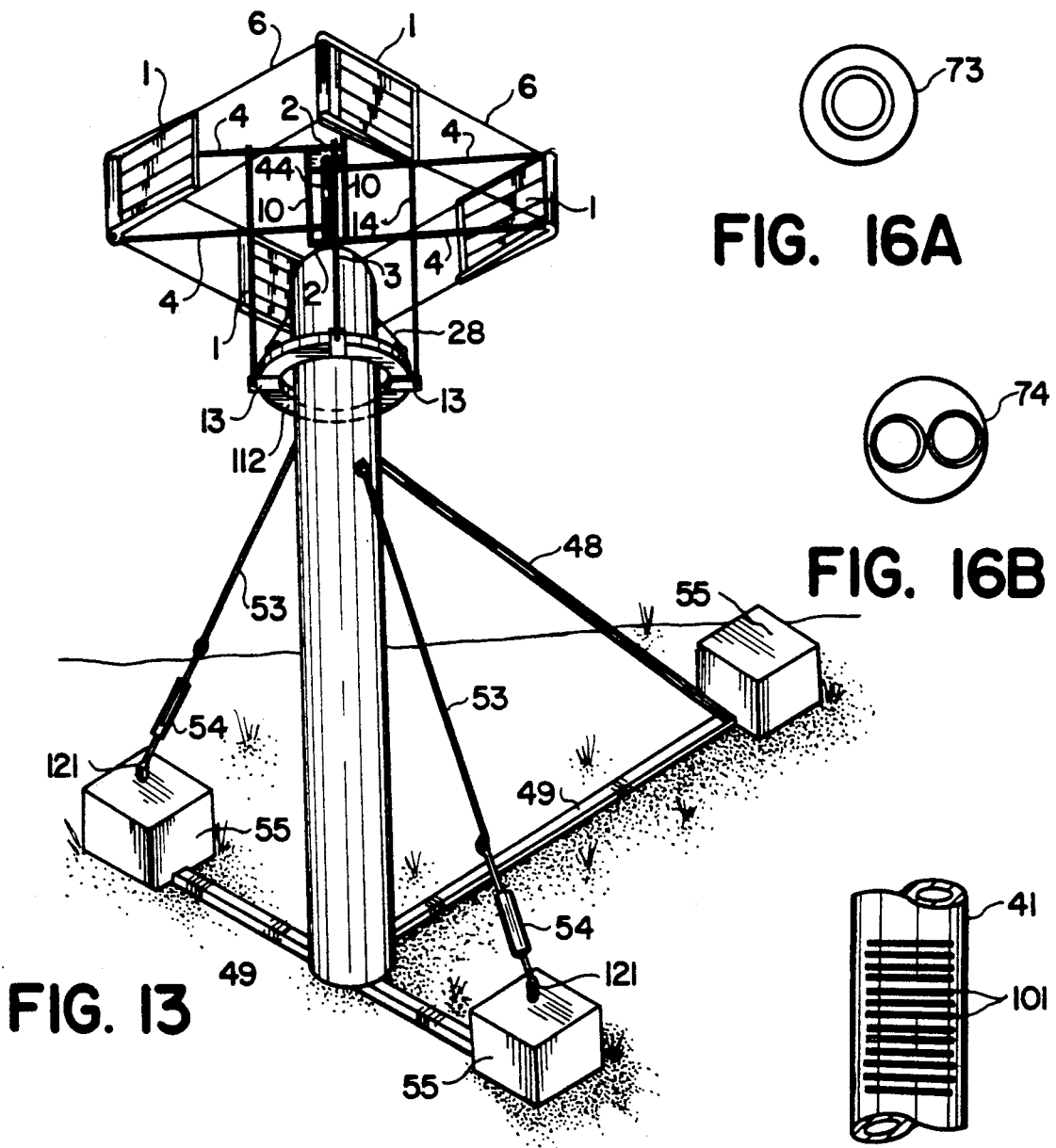
FIG. 18 is a detail of the well casing perforations.

The pistons 57 are assembled from components shown in FIGS. 14 and 15. The foot valves 77 are built identical to the pistons 57 but without the cable attachments 69 or the ballast weights 72. The upper tie pin 58 which ties the barrel 156 of piston 57, the upper pump leather 60 and the upper insert 59 is available for grappling in the foot valve 77, if it should need to be removed. Upper tie pin 58 also retains the cable attachment 69 in the piston 57. Rubber check valve seal 64 is inserted into the groove 155 in check valve 63, and then spacer 61, guide 62, check valve 63 and valve seat 65 are slipped into barrel 156 of piston 57. A gasket 67 is followed by the lower pump leather 66 and lower insert 68. The parts are all tied together with lower pin 58. The ballast weight 72 is also held with the lower pin 58 in piston 57. The steel weight 72 is galvanized or plated to prevent rust, the bottom edge being rounded to help in insertion of the piston. The top is beveled to direct water up through the piston 57 in the down stroke. A brass clevis 70 is drilled and sucker cable 28 is sweated into it with silver rich solder. The galvanized steel cables 28 can be purchased with a heavy vinyl coating for protection. These cables 28 pass up through the sucker pipe 29 and pass over rollers 33 in the barrel 31 of the sucker pipe cap assembly 32; see FIG. 10. Cables 28 then tie to the pumping apparatus of the windmill 150 at either connectors 24 on the semaphore assembly 151 or relay to sucker attachment 117 on the relay 159. They are held with standard, removable cable clamps (not shown).

Element 34 is a short length of shafting cut to span across slot 133 in the side of cap barrel 31, thereby to form an axle for roller 33. Rollers 33 may be molded of a tough bearing grade plastic, or they may be cast or wrought wheels with ball bearings or the like. Axle 34 will be sized to tolerate the load of the water lift which will vary with the depth of the well. Axle or shaft 34 is clamped with clamps 35 on either side of slot 133, with screws and lock washers drilled and tapped into holes 134 in the face of barrel 31.

The main pump assembly 100 is built up to the size required, which is dependent on the size of the well casing pipe 41. Pump assembly 100 is made of brass tubing and brass plate and then brazed together with inlet cylinder 79 having a filter fitting, dual to single inlet partition 78, brass dual cylinder sleeves 76, single to dual cylinder partition plate 74, outlet chamber 75, and outlet cylinder sucker pipe fitting adapter 73, all fabricated and brazed together to make one single complete unit. Outlet chamber 75 is long enough and roomy enough to allow the piston 57 to stand free and erect before falling into cylinder sleeves 76. Partition plate 74 surrounds the outside of cylinder sleeves 76 so the pistons 57 have free access to the cylinder sleeves 76 which also have the entrance opening slightly reamed for easier entrance. Weight 72 will pull the piston 57 rather slowly down into the well water the first time it is inserted. After it is pumped, however, there should be a considerable differential in pressure across the piston 57 to push it down rapidly.

Figures 25, 27:
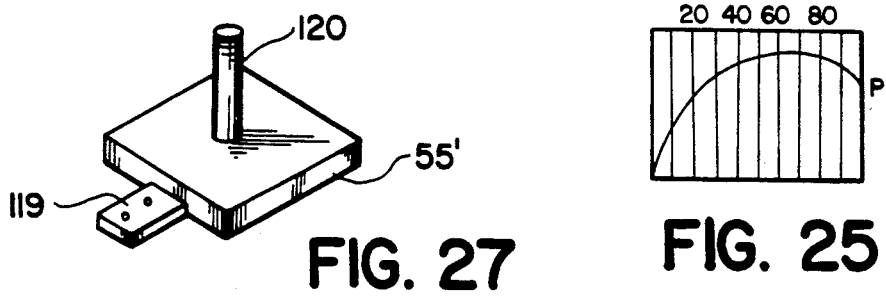
FIG. 25 is a graph showing a typical power to wind-speed curve of the turbine.
FIG. 27 is a perspective view of a concrete block lamination.

The windmill base 49 is made of channel iron bolted together to form a tee by means of angle connectors 118. This channel iron base 49 is bolted to foundation blocks 51 or surface anchor blocks 55. Anchor blocks 55 are a new innovation made up of reinforced concrete laminations which can be stacked to form an anchor block heavy enough to anchor the windmill 150, even in high winds. One lamination 55' is shown in FIG. 27. As an example, a lamination 24"×24"×2" would weigh approximately 90 pounds. Six of these layers would weigh approximately 540 pounds which, in most cases, would suffice to anchor a standard windmill 150. The bottom lamination 55' has a steel bar 119 running through it and extending out to tie to the channel iron base 49. The bottom lamination 55' also has a rebar or reinforcement bar looped around inside (not shown). A heavy stud 120 is tapped into bar 119. The succeeding layers all contain reinforcement bars or rebars (not shown) but not the steel tie bar 119. Each lamination has a hole in the center to fit over stud 120. Eye nut 121 ties the layers together, and also acts as a terminal for support cables 53. These anchor blocks 51, 55 make it possible to completely prefabricate this system and allow it to be erected without the delay of curing out concrete for the foundation.

Cradle 38 is made of two heavy steel angle irons, drilled to be bolted to base 49 and slotted to accommodate mainmast pivot shaft 37. Strut 48 is made of the same size channel iron as base 49.

With the base 49, anchor blocks 55 and cradle 38 ready, the pivot shaft 37 of mainmast 27 is laid into the cradle 38, with the upper end lying across a horse or other temporary support (not shown) high enough to clear turbine 150, FIG. 1. Two or three heavy washers 122 are slipped over main shaft 44 to rest on top of mainmast 27. The assembled turbine 150 and swash plate 12 are then slipped over the main shaft 44 with set collar 47 following the lower main bearing 3. When both main bearings 3 are on the shaft 44, they are slipped down the shaft 44 until the lower main bearing 3 rests on washers 122 on the shaft 44. Main bearings 3 are tightened on shaft 44 with set screws (not shown) and then set collars 47 are tightened against the tops of both main bearings 3. These set collars 47 together with grooves 155 cut into shaft 44 where the "U" bolts 45 fit into them, prevent the assembly 151 from being forced upward in heavy braking action. Next, the front bar 17 of the semaphore assembly 151 is completely assembled with bearing 21, shafts 23, wheels 22 and connectors 24 all in place. Bar 17 is fitted and tightened to shaft 20 with set screws (not shown). The rear semaphore bar 18 with bearing 21 is also mounted and tightened on the rear of shaft 20. Bolts 19 tie the semaphore assembly 151 together.

Swash plate 12 should be adjusted up or down with swash attachment nuts 15 on suspension rods 14 so that transmission wheels 22 ride loosely on top of swash plate 12. When adjusted properly, one wheel 22 will have a clearance of about ⅛ inch when the other wheel 22 is in contact with swash plate 12. Turbine 150, FIG. 1. can then be turned manually to check the action of turbine 150 and semaphore assembly 151, FIG. 7.

A clamp 56 made of flat band iron is formed to fit around mainmast 27 with drilled flats on each end to fit against strut 48. Clamp 56 also has tabs 46 welded at each side which are bored to receive guy cables 53. Clamp 56 is fitted around mainmast 27 and bolted to strut 48 through a hole drilled close to the top end of strut 48. Mainmast 27 could have been laid outward from T base 49 or backward across "T" base 49. In either case, strut 48 should be "walked " as windmill 150 is raised toward its eventual position which is tie-socket 50. Guy cables 53 should also be looped through tabs 46 and double-lined down to open turnbuckles 54 set in place on blocks 55. As windmill 150 is raised, guy cables 53 should be kept loosely free but tight enough to keep mainmast 27 from toppling sideways. Windmill 150 may be lifted with a crane, hoist or jack until it is practically plumb. At this point strut 48, with clamp 56 still loose, should be set in tie-socket 50 and a bolt 158 passed through the holes in tie-socket 50 and strut 48 and loosely nutted. Mainmast 27 should then be brought to a perfect plumb and tied in place by tightening clamp 56, followed by making both guy cables 53 rigid with turnbuckles 54. Bolt 158 in tie-socket 50 is then tightened to cinch the strut 48 and prevent the structure from moving even in the heaviest winds. Subsequently, sucker pipe 29 is run up to connect into mainmast 27 at water inlet fitting 40. Water inlet fitting 40 is coupled to mainmast 27 by a clamped rubber hose 123. Sucker pipe 29 is then run up to the cap assembly 157, FIG. 10. Sucker cables 28 are pulled over rollers 33 to the outside. Cap 32 completes the sucker pipe run. Sucker pipe 29 is separated from the mainmast 27 with wood or fiber spacer blocks 43 and strapped firmly to mainmast 27 with strapping 42. Cap assembly 157 is mounted on sucker pipe 29 by coupling element 30.

With turbine 150, FIG. 1. stopped and tied down so that the semaphore bar 17 is perfectly level, and with the pistons 57, FIG. 14, both sitting on the bottom of cylinders 76, each of the cables 28 are pulled up for enough to lift both pistons 57, FIG. 14, to the half-way mark in their respective cylinders 76. Cables 28 should be marked where by emerge from cap barrel 31, and then tied firmly to attachment fittings 24. Turbine 150 should be rolled a few times and then cables 28 should be checked to be certain the marks are just emerging from cap-barrel 31 simultaneously with the leveling of semaphore arms 17 and 18. This completes the installation of the standard basic windmill and it is now ready for use.

In colder climates, this particular windmill 150 construction lends itself to an easy application of insulation. One method of insulation is shown in FIGS. 13, 13A and 19. This method uses pre-molded sections 52 of expanded polyurethane to fit around mainmast 27 and sucker pipe 29. The sections 52 are molded, numbered, covered with vinyl or bright aluminum and held together with standard aluminum or vinyl strapping (not shown).

Where electricity is available, an alternative motor drive can be provided for use when the wind dies down. This system uses a mechanical relay 159 which is connected to the semaphore assembly 151 by cables 102 and accordingly has a reciprocation corresponding to that of the semaphore assembly 151. The rocker 124 on this relay 159 has extension arms or shafts 125 with attachments 116 to which sucker cables 28 can be attached. As relay 159 rocks, it moves the pistons 57 in the pump assembly 100 up and down to pump water out of the well. Relay 159 has the added advantage in that the sucker cables 28 may be moved inwardly or outwardly on extension shafts 125 to change the length of the piston stroke. The further out on each extension shaft 125 in equal distances, the longer the stroke of the pistons 57.

When windmill 150 fails to pump enough water to keep the storage tank in mainmast 27 at least halfway full, a pressure switch 103 working on the water pressure at the base of the tank in mainmast 27 closes an electrical circuit (see FIG. 24) to a gear motor 89 which cranks the relay 59 and the pump pistons 57 at about the same rate and speed as that of the windmill 150. At the same time, electromagnetic holding devices 97 disconnect the windmill 150 from the relay 59 so that even though the windmill 150 may begin turning, it will not affect the pumping operation of the motor. However, the motor 89 will only pump the water level up a short distance to reach the cut-off point of the pressure switch 103 and as soon as the motor 89 is stopped the windmill 150 is reconnected and if it can pump enough water to prevent the level falling to the cut-in pressure again it will continue to drive the pump assembly 100. However, if the water level does fall, the motor 89, once again, takes over.

In operation, front and rear angle iron rocker beam arms 83, 124 are bored and drilled midway for front and rear bearings 85. These bearings 85 are mounted with set screws (not shown) on shaft 81, which passes through the tank in mainmast 27 and extends out through the insulation 52, front and rear. Arms 83 and 124 are then coupled together with connector rods 84. Extension shafts 125 are attached to relay arm 83 with "U" bolts 126. Sucker cables 28 are attached to movable attachment fittings 116. Release arm 91 is pivoted at 127 and is tied to the semaphore assembly 151 by cables 102 and eye bolts 93. Arms 91 are made of rectangular steel tubing and have a release arm tongue 36 inserted in the release arm 91 end made of a tough bearing grade plastic. Arm 91 is held in place by plunger 94 which passes into the center of solenoid 97 and rests in support 96. Plunger 94 is pushed outwardly when the solenoid 97 is deenergized by spring 95. Rocker beam crank assembly 86 is pivoted at 128 and is engaged to gear motor 89 by a free rolling, rimmed wheel 88 which is attached to flywheel 87. Flywheel 87 is attached to the shaft 140 of gear motor 89 with set screws (not shown). Gear motor 89 is mounted on platform 90 which is bolted to base member 49.

Gear motor 89 is operated by pressure switch 103 which, when it closes, starts gear motor 89 and also energizes solenoid 97.

Figure 21:
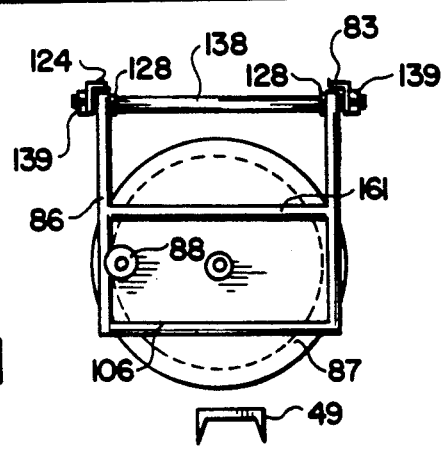
FIG. 21 is a detail of the gear motor flywheel and rocker beam cranks.

When the water level in the tank of mainmast 27 is higher than the cut-in level, switch 103 will be open and the gear motor 89 is idle. Relay arms 83, being connected to the semaphore bar 17 by cables 102, rock in unison with semaphore bar 17. As crank 86 moves up and down and since motor 89 is idle, wheel 88 is pushed freely around the rails 161 of rocker beam crank assembly 86 until it is positioned midway between the top and bottom rails 83, 124 of crank assembly 86 on either the right or left side and wheel 88 remains stationary as long as the gear motor 89 is idle. The crank assembly 86 has enough space between rails 161 to move up and down, turning the free rim of wheel 88 perhaps but not affecting the gear motor 89 or flywheel 87. Crank assembly 86 is made of square steel tubing, welded together as shown in FIG. 21. Crank assembly 86 is hung from relay arm 83 which is drilled for an axle 138 and oilless bearings 128. Axle 138 is held in position by set collars 139. When the water level in pipe 27 falls past the cut-in point, switch 103 closes and start motor 89 and as wheel 88 is carried around with flywheel 87 it rides in the rails 161 of relay arms 83 up and down to operate pistons 57, FIG. 14, and pump water. Also, when the solenoids 97 are energized they retract plungers 94 and release arms 91. These arms 91 then move freely up and down as the relay 159 rocks beneath them but since the cables 102 are free and pivoted close to the center of relay arms 83 there is no transfer of power from the relay 159 to the semaphore bar 17. When switch 103 opens and stops motor 89, spring 92 is strong enough to pull release arm 91 down over solenoid plunger rod 94 which ratchets and recouples the semaphore bar 17 and relay arm 83.

Figure 24:
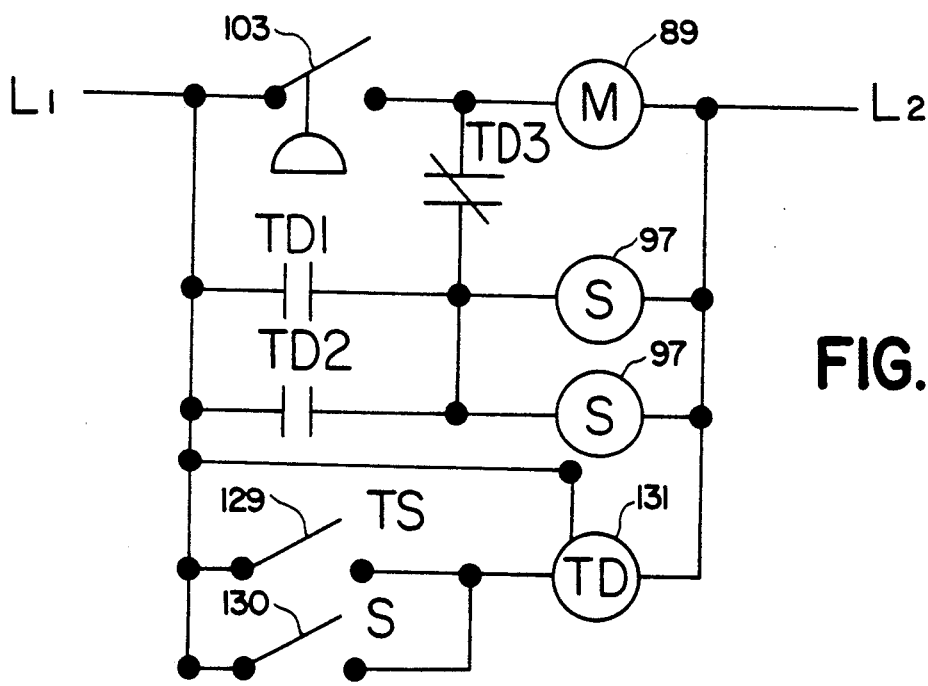
FIG. 24 is a view of the electrical circuit.

FIG. 24 shows the complete wiring diagram of the Wind-Electric Water Pumping System. Pressure switch 103 closes when there is a drop in water pressure in the tank in mainmast 27. This starts gear motor 89 and energizes solenoid 97, thus disconnecting windmill 150 from the pump train. A rise of the water level in the tank of mainmast 27 to cut-off point opens switch 103 and deenergizes motor 89 and solenoid 97. This stops gear motor 89 and reconnects the windmill 150 to the pump assembly 100. When the water level in the tank of mainmast 27 rises close to the top, it closes tilt-switch 129 which energizes solenoid 97 to disconnect windmill 150 from pump assembly 100. Closing tilt-switch 129 energizes a time delay relay 131 which keeps solenoid 97 energized for a predetermined length of time even though tilt-switch 129 opens by closing NC contacts TD1 and TD2. This prevents short cycling. NC contacts TD3 open with the energization of time delay relay 131 to prevent motor 89 from coming on with solenoid 97. If the operator wishes to manually stop the windmill pump, he may close switch 130.

A length of threaded rod 141 passes through a hole drilled in cap 113 and is secured above and below cap 113 with washers and nuts. A float ball 132 and arm 142 is pivoted in the clevis 144 with a bronze bolt 143. A glass mercury tilt-switch 129 is strapped to arm 142 and positioned so that the mercury makes switch contact when the arm 142 is approximately level. It opens contact when the arm 142 drops below the level position. An electric line is run to a control box (not shown) at the base where it controls time delay relay 131.

The most outstanding feature of the Wind-Electric Water Pumping System is the large volume of water it pumps as compared with similar windmills used in the past. Owing to the use of two cylinders instead of one and to its two strokes for each revolution of the windmill, this system compares quite favorably with electric submersible pumps in volume. This is especially true with the deeper water well where the submersible pumps become very inefficient in deep wells due to the pressure and weight of the water to be lifted.

The disclosed system is also very rugged, being able to continue to work in very high winds. The disclosed system is even more stable when the mainmast tank is filled with water. By way of example only, a tank with 100 gallons of water in it weights approximately 1000 pounds. With my rugged triangular guy system and anchor blocks it is almost impossible to get enough wind force working against it to topple it.

A third feature is the economy of its cost and operation. While it might seem to be rather expensive to build and install the disclosed system, the initial cost becomes quite favorable when it is compared to the cost of building a well house, insulating the well house, and heating the well house for the submersible pump. Of course, the real savings come in the operating cost. Even if the gear motor had to run continuously, its energy cost would be very low in comparison to a submersible pump. Where a 19 stage submersible pump must use at least 1½ horsepower to operate it, my 400 foot well will use, at a maximum, not more than a ½ horsepower gear motor to operate the system.

One of the outstanding values of the disclosed water pumping system is its versatility. With a small booster pump to supply higher pressure, if desired, the disclosed system can be used in any of the homes and farms which use well water anywhere in the world. The disclosed system can be used on deep wells or shallow wells, springs, lakes, or rivers. It can be used in high wind areas and low wind areas. With a standard wind energy formula it can be sized to fit any applicable load:

$$\text{Watts} = \text{Area} \times \text{Wind Velocity mph}^3 \times 0.0051 \times \text{Efficiency}$$

Area in this case is the height of the sails times the length of the long axis of the turbine. Also, 0.0051 is the amount of energy present in one square foot of surface at a windspeed of 1 mph, 0.35 is used as a conservative efficiency rating. The watts generated can be converted to horsepower, foot lbs, meter grams or other energy equivalent to find the properly sized turbine, in area, to fit the requirements of the job.

And, of course, there is nothing whatever to prevent the use of the gear motor with the dual piston balanced water pumping system without the windmill.

While it will be apparent that the preferred embodiment of the invention herein discloses is well calculated to fulfill the objects above-stated, it will be appreciated that the invention is susceptible to modification, variation and change without departing from the proper scope or fair meaning of the subjoined claims.

I claim:

1. A wind-electric water pumping system comprising:
   a square wheel turbine having a specially constructed sails at each corner;
   a mainmast providing support for said square wheel turbine;
   said mainmast including a tank for storing pumped water;
   a well casing extending into a well to provide protection to two alternatively operable pumping units encased in two parallel cylindrical sleeves;
   a single sucker pipe connected to said two parallel cylindrical sleeves and guiding two sucker cables connected respectively to said pumping units at one end and to a semaphore assembly at an opposite end;
   said semaphore assembly being located near the top of said mainmast and having wheels which ride on an angularly disposed swash plate connected to rotate with said turbine; and
   said sucker pipe being connected to said tank by a water inlet fitting; whereby
   when said turbine is rotated by a wind force, said swash plate is also rotated to drive said semaphore assembly which in turn alternately drives said sucker cables and said pumping units to alternately raise water through said respective cylinder sleeves with less energy expended per pumping unit cycle than would be expended by a single pumping unit designed to pump the same amount of water.

2. A wind-electric water pumping system as in claim 1, said square wheel turbine further comprising:
   four sails, one sail being located in each corner of the turbine;
   each said sail including reinforcing creases longitudinally located along the length of said sail, light sideboards along the top and bottom of said sails, a semi-cylindrical nose piece connected to said sail at one end of said sail, a tail piece located at an opposite end of said sail, and draw cables connected to said sails; whereby
   the sails are drawn into a square turbine configuration.

3. A wind-electric water pumping system as in claim 2, further comprising:
   an electric motor connected to said semaphore assembly through a mechanical relay controlled by a switching means;
   said switching means sensing when said turbine is not actuated by the wind so as to disconnect said turbine from said two alternately operable pumping units and to simultaneously connect said electric motor to said alternately operable pumping units; whereby
   said pumping units can continue to operate when wind power is not available.

4. A wind-electric water pumping system as in claim 3, said two alternately operable pumping units are so connected that the descent of one pumping unit of said two alternately operable pumping units aids in the ascent of the second of said two alternately operable pumping units.

5. A wind-electric pumping system as in claim 4, each pumping unit of said two pumping units comprising:
   a piston;
   a lower foot check valve connected to a lower portion of said piston;
   an upper check valve connected to an upper portion of said piston; and
   a weight depending from said lower portion of said piston beneath said lower foot check valve;
   said valves being closed when said piston is being raised in said cylindrical sleeve, whereby water above said piston is raised to an inlet fitting connected to said tank; and
   said valves being open during descent of said piston so as to enable water to flow through said piston to be subsequently raised by said piston;
   the provision of two pumping units enabling the raising of each piston with less energy than would be required if only one pumping unit were provided.

6. A wind-electric water pumping system as in claim 3, further comprising:
   cable means connecting a rockable bar in said semaphore assembly to a corresponding rockable bar in said mechanical relay;
   said rockable bar in said mechanical relay having alternative connecting means for said sucker cables;
   said mechanical relay further including an electric motor responsive to a water pressure switch in said tank, said water pressure switch forming part of said switching means;
   said electric motor being effective to oscillate said rockable bar in said mechanical relay when turned on;
   said switching means further including solenoid means operable to disconnect said rockable bars in said semaphore assembly and said mechanical relay; whereby
   when said sucker cables are attached to said rockable bar in said mechanical relay, rotation of said square wheel turbine will oscillate said rockable bar in said mechanical relay through said swash plate, said rockable bar in said semaphore assembly and said cables connecting said rockable bars, thereby shifting said sucker cables to effect pumping, and when said water pressure switch indicates a low or nonexistant water pumping, said solenoid means is actuated to disengage said rockable bar in said mechanical relay from said rockable bar in said semaphore assembly, whereby further oscillation of said rockable bar in said mechanical relay is controlled solely by said electric motor, thereby to operate said sucker cables and said pumping units by said electric motor.

7. A wind-electric water pumping system as in claim 2, said two alternately operable pumping units are so connected that the descent of one pumping unit of said two alternately operable pumping units aids in the ascent of the second of said two alternately operable pumping units.

8. A wind-electric pumping system as in claim 7, each pumping unit of said two pumping units comprising:
   a piston;
   a lower foot check valve connected to a lower portion of said piston;

an upper check valve connected to an upper portion of said piston; and a weight depending from said lower portion of said piston beneath said lower foot check valve;

said valves being closed when said piston is being raised in said cylindrical sleeve, whereby water above said piston is raised to an inlet fitting connected to said tank; and said valves being open during descent of said piston so as to enable water to flow through said piston to be subsequently raised by said piston;

the provision of two pumping units enabling the raising of each piston with less energy than would be required if only one pumping unit were provided.

9. A wind-electric water pumping system as in claim 1, further comprising:

an electric motor connected to said semaphore assembly through a mechanical relay controlled by a switching means;

said switching means sensing when said turbine is not actuated by the wind so as to disconnect said turbine from said two alternately operable pumping units and to simultaneously connect said electric motor to said alternately operable pumping units; whereby said pumping units can continue to operate when wind power is not available.

10. A wind-electric water pumping system as in claim 9, said two alternately operable pumping units are so connected that the descent of one pumping unit of said two alternately operable pumping units aids in the ascent of the second of said two alternately operable pumping units.

11. A wind-electric pumping system as in claim 10, each pumping unit of said two pumping units comprising:

a piston;

a lower foot check valve connected to a lower portion of said piston;

an upper check valve connected to an upper portion of said piston; and a weight depending from said lower portion of said piston beneath said lower foot checks valve;

said valves being closed when said piston is being raised in said cylindrical sleeve, whereby water above said piston is raised to an inlet fitting connected to said tank; and said valves being open during descent of said piston so as to the enable water to flow through said piston to be subsequently raised by said piston;

the provision of two pumping units enabling the raising of each piston with less energy than would be required if only one pumping unit were provided.

12. A wind-electric water pumping system as in claim 9, further comprising:

cable means connecting a rockable bar in said semaphore assembly to a corresponding rockable bar in said mechanical relay;

said rockable bar in said mechanical relay having alternative connecting means for said sucker cables;

said mechanical relay further including an electric motor responsive to a water pressure switch in said tank, said water pressure switch forming part of said switching means;

said electric motor being effective to oscillate said rockable bar in said mechanical relay when turned on;

said switching means further including solenoid means operable to disconnect said rockable bars in said semaphore assembly and said mechanical relay; whereby when said sucker cables are attached to said rockable bar in said mechanical relay, rotation of said square wheel turbine will oscillate said rockable bar in said mechanical relay through said swash plate, said rockable bar in said semaphore assembly and said cables connecting said rockable bars, thereby shifting said sucker cables to effect pumping, and when said water pressure switch indicates a low or nonexistant water pumping, said solenoid means is actuated to disengage said rockable bar in said mechanical relay from said rockable bar in said semaphore assembly, whereby further oscillation of said rockable bar in said mechanical relay is controlled solely by said electric motor, thereby to operate said sucker cables and said pumping units by said electric motor.

13. A wind-electric water pumping system as in claim 1, said two alternately operable pumping units are so connected that the descent of one pumping unit of said two alternately operable pumping units aids in the ascent of the second of said two alternately operable pumping units.

14. A wind-electric pumping system as in claim 13, each pumping unit of said two pumping units comprising:

a piston;

a lower foot check valve connected to a lower portion of said piston;

an upper check valve connected to an upper portion of said piston; and a weight depending from said lower portion of said piston beneath said lower foot check valve;

said valves being closed when said piston is being raised in said cylindrical sleeve, whereby water above said piston is raised to an inlet fitting connected to said tank; and said valves being open during descent of said piston so as to enable water to flow through said piston to be subsequently raised by said piston;

the provision of two pumping units enabling the raising of each piston with less energy than would be required if only one pumping unit were provided.

* * * * *